UNITED STATES PATENT OFFICE.

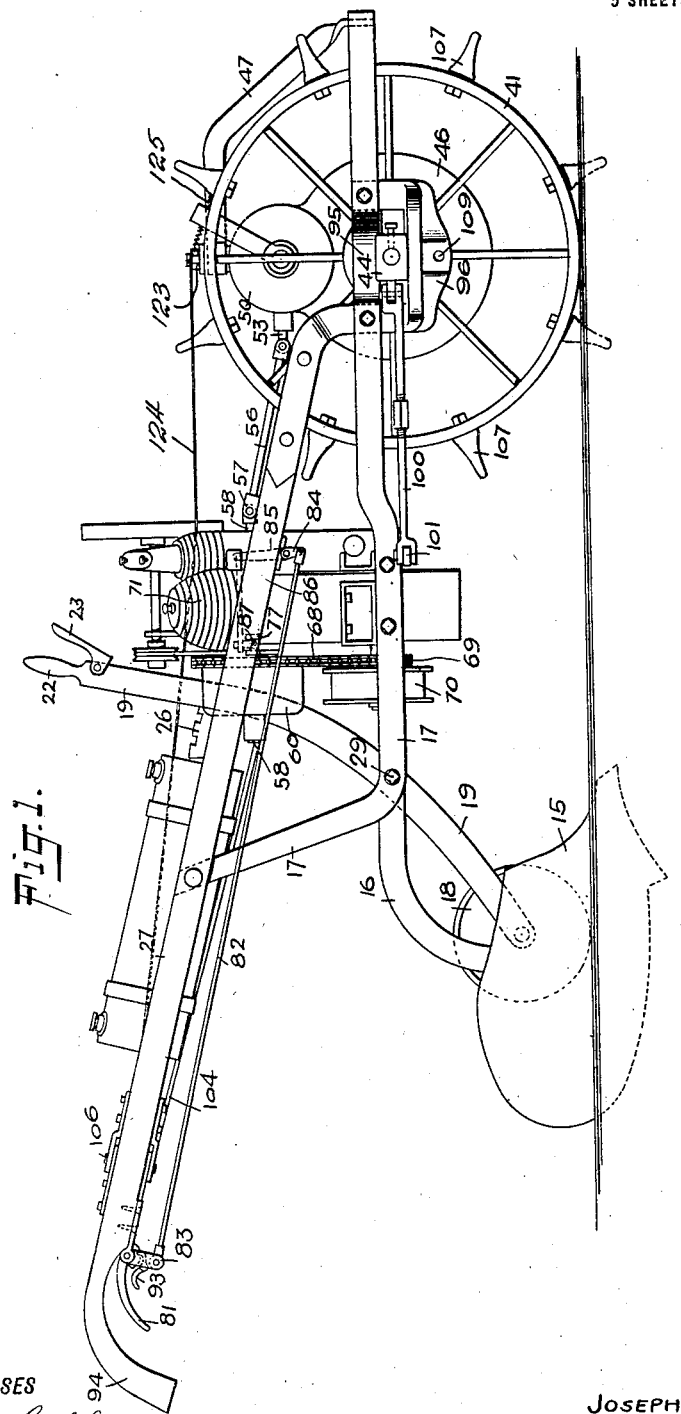

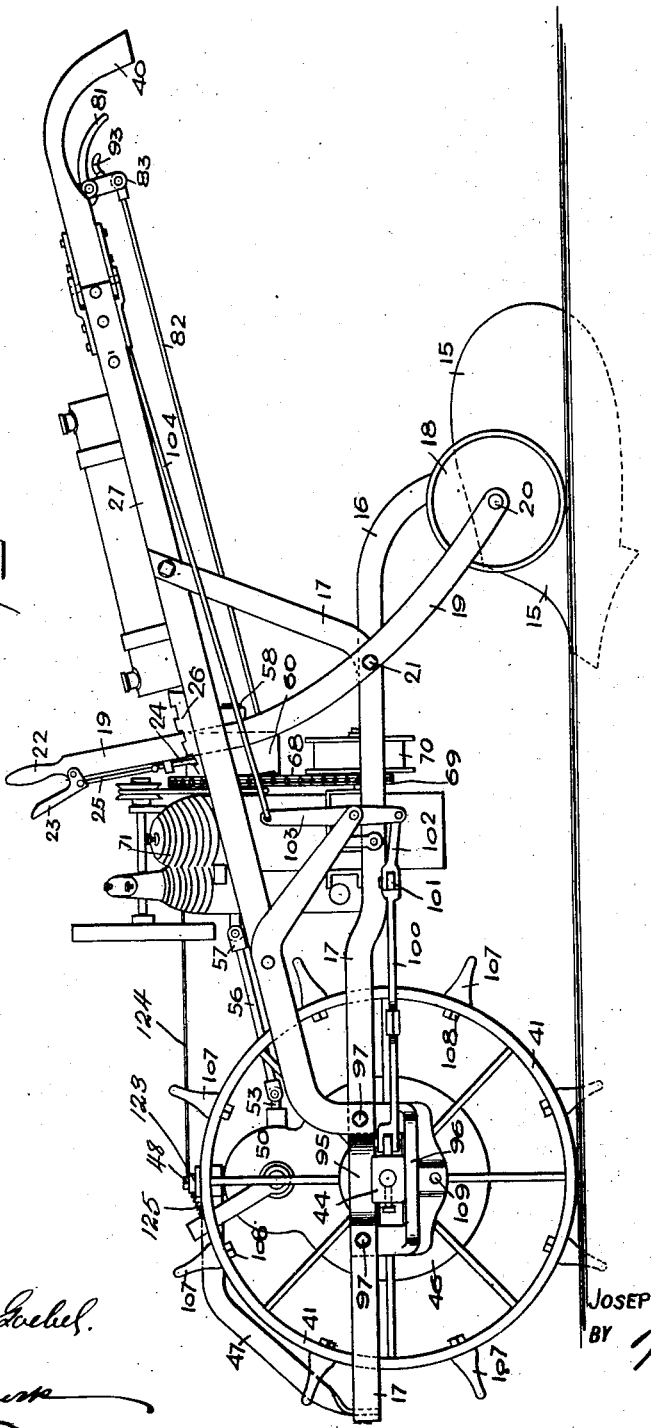

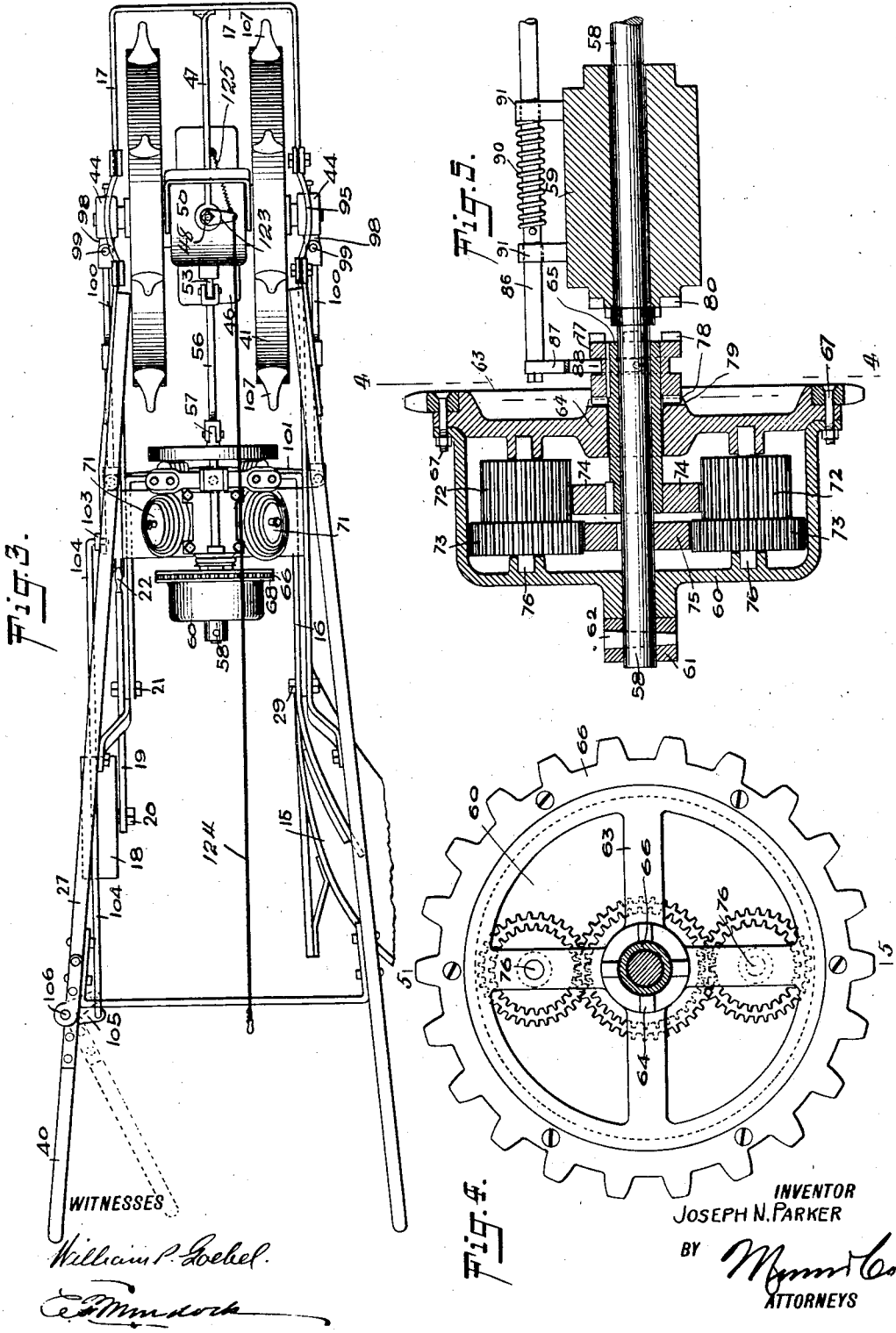

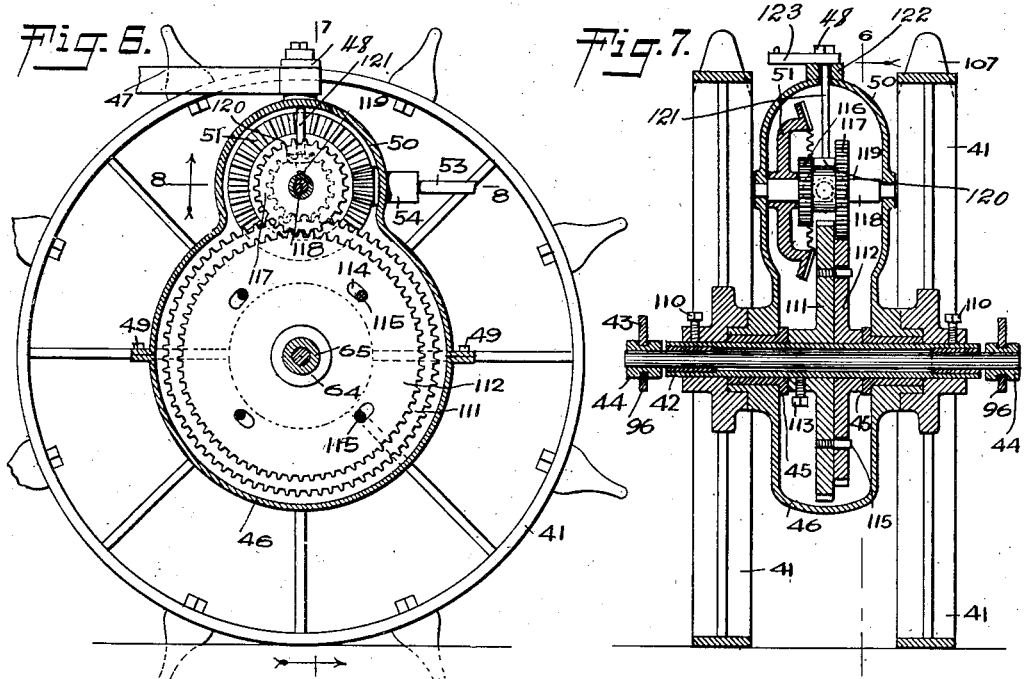
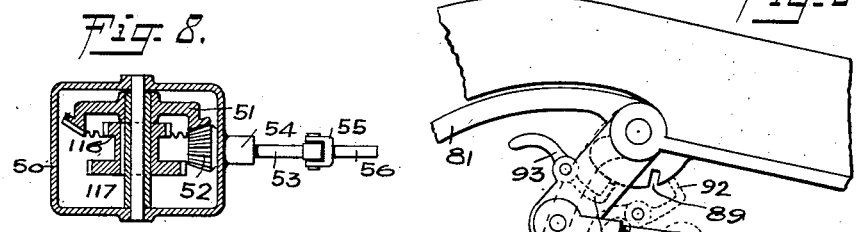
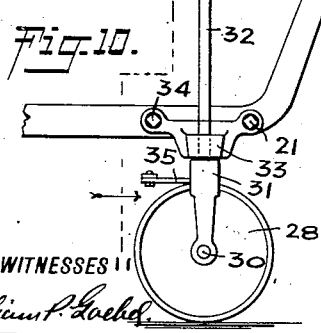
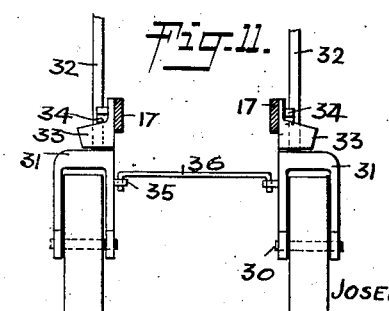

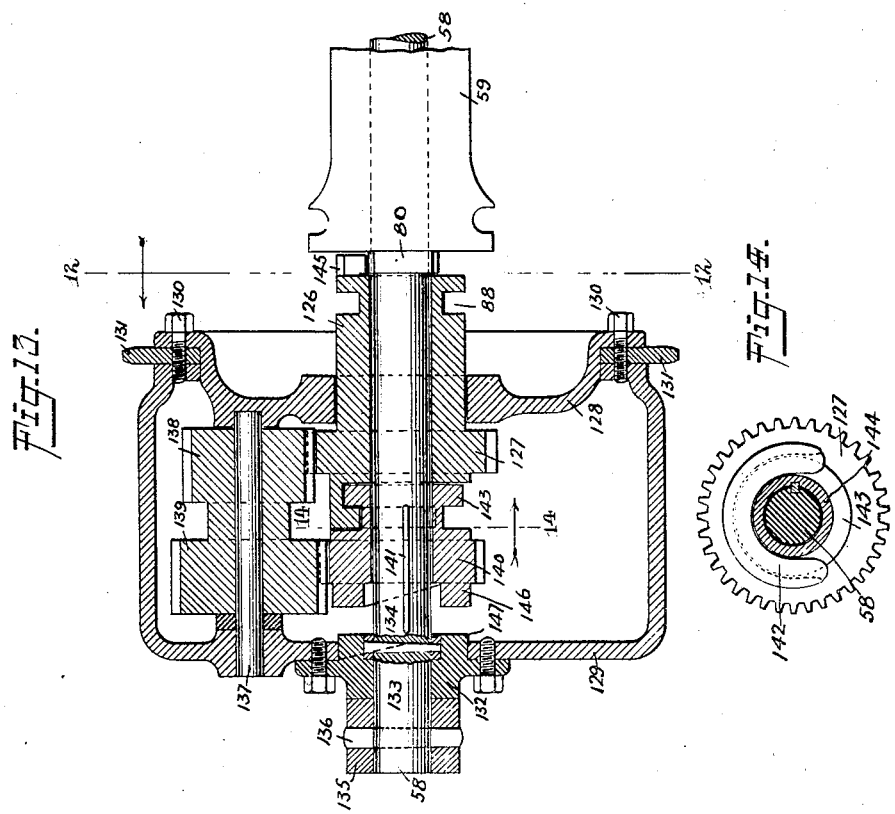
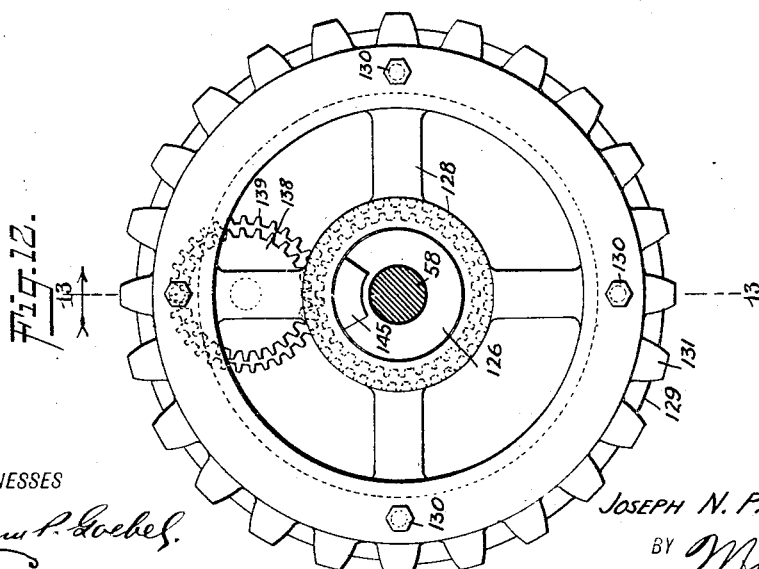

JOSEPH NICHOLAS PARKER, OF BEDFORD, VIRGINIA.

TRACTOR FOR MOTOR-PLOWS.

1,363,910.  Specification of Letters Patent.  Patented Dec. 28, 1920.

Application filed November 29, 1919. Serial No. 341,386.

*To all whom it may concern:*

Be it known that I, JOSEPH N. PARKER, a citizen of the United States, and a resident of Bedford, in the county of Bedford and State of Virginia, have invented new and Improved Tractors for Motor-Plows, of which the following is a full, clear, and exact description.

The present invention relates more particularly to improvements in the construction and arrangement of the parts composing the motor plows for which patents were granted to me, said patents bearing dates and numbers as follows: September 16, 1913, No. 1,073,513, and October 7, 1913, No. 1,075,061; and has among its principal objects: to improve the operation and reduce the cost of construction of the traction mechanism; to promote the manual control of the plow and traction mechanism thereof; to vary the traction speed of the implement; and to simplify the construction of the details constituting the above-mentioned plow.

In the drawings:

Figure 1 is a side elevation of a plow constructed and arranged in accordance with the present invention;

Fig. 2 is a similar view taken from the reverse side of the plow;

Fig. 3 is a top plan view of the same;

Fig. 4 is a detail view, on an enlarged scale, showing the approved construction and arrangement of the reversing gear with which the plow is provided, and in conjunction therewith, a section of the transmission shaft, the section being taken on the line 4—4 in Fig. 5;

Fig. 5 is a cross section of the same, taken on the line 5—5 in Fig. 4;

Fig. 6 is a vertical section taken on the line 6—6 in Fig. 7;

Fig. 7 is a vertical section taken on the line 7—7 in Fig. 6;

Fig. 8 is a horizontal section taken on the line 8—8 in Fig. 6;

Fig. 9 is a detail view on an enlarged scale, showing the grip lever for controlling the driving mechanism with which the plow is provided;

Fig. 10 is a detail view on an enlarged scale, showing an auxiliary carrying wheel for the plow when moving to and from the field of action, and in conjunction therewith means for controlling the same as a steering wheel;

Fig. 11 is a vertical section taken on the line 11—11 in Fig. 10;

Fig. 12 is an end view of a modified form of the reversing gear, the driving shaft bearing shown in section, the section being taken on the line 12—12 in Fig. 13;

Fig. 13 is a longitudinal section taken on the line 13—13 in Fig. 12;

Fig. 14 is a cross section of the driving shaft and hub of one of the gears, the section being taken on the line 14—14 in Fig. 13.

As seen in the accompanying drawings, a plow 15 is suspended by a beam 16 on the hanging frame 17 of the tractor element of the machine. It will be understood that the plow 15 and the beam 16 thereof may be replaced by agricultural implements of various types, or, if desired, may be dispensed with, and the carrying wheels shown in Figs. 10 and 11 may be installed in service relation in the space occupied by said plow or other substituted implement. When the machine is equipped with the plow 15, it is likewise provided with a land wheel 18, which wheel is pivotally mounted at the lower end of a lever 19, a stud shaft 20 being provided therefor, as best seen in Fig. 2 of the drawings.

The lever 19 is pivoted on the hanging frame 17 at the opposite side thereof from the support provided for the plow 15. Above the pivot bolt 21, the lever 19 is provided with a hand grip 22 and a grip lever 23 pivotally mounted on the lever 19. Suitably mounted on the lever 19 is a slide bolt 24, which is operatively connected by rod 25, with the grip lever 23. The bolt 24 engages teeth provided in a quadrant plate 26 mounted on one of the handle bars 27 with which the implement is provided.

The teeth in the quadrant plate 26 are engaged by the bolt 24, to hold the lever 19 in various positions. It is obvious that as the lever 19 is moved, the wheel 18 is relatively raised and lowered to regulate the depth of operation of the plow 15.

When the carrying wheels 28 are installed, the bolts 21 and 29 are employed in part to hold the brackets 33. The wheels 28 are mounted on short axles 30, which have bearings in the ends of the arms of yokes 31. The yokes 31 are rigidly connected with vertical shafts 32, which pass through, and have bearings in, brackets 33. The brackets 33 are further secured in service position by bolts 34, as seen best in Fig. 10 of the drawings.

The wheels 28 are in part employed as steering wheels, and for this purpose, the yokes 31 have each an extension rod 35, provided at the free end with an eyelet to receive the hook ends of a connecting bar 36. One of the shafts 32 is bent to form a crank portion 37, which is pivotally connected with a lever 38. The lever 38 is pivotally mounted in a bracket 39, which is mounted on one of the handle bars 27 and adjacent the grip handle 40. The grip handle 40 is likewise employed to steer the implement, but, as a rule, to steer the same when employed in the operation of plowing or cultivating.

The frame 17 is rigidly connected with the handle bars 27, and forms therewith the frame for supporting the traction mechanism with which the implement is provided. The traction mechanism consists primarily of tractor wheels 41. The wheels 41 are rigidly mounted on a sleeve 42, which is suitably supported by a non-rotative shaft 43, the ends of which shaft are rigidly secured in guide blocks 44.

The sleeve 42 is mounted in bearing boxes 45 suitably mounted in a gear case 46 suspended between the wheels 41, as best shown in Fig. 7 of the drawings. The case 46 is shaped to provide a journal for the hubs of said wheels, and is prevented from rotating by a brace rod 47, secured at the top of the case by a bolt 48, as best seen in Fig. 6 of the drawings. The case 46 is preferably constructed in two parts united on a horizontal joint by bolts 49, the upper part having an offset 50 provided to receive the change-speed and master driving gear wheel provided to rotate the wheels 41.

The master gear wheel referred to is the dish-wheel, a raised flange whereof is provided with gear teeth set to an angle to correspond with the pinion 52 with which a short shaft 53 is furnished, as best seen in Fig. 8 of the drawings. The shaft 53 extends beyond the case 46 and the offset 50 thereof, and has a bearing in a boss 54 on said case. The shaft 53 is connected by means of a knuckle 55 to a link shaft 56. The link shaft 56 is connected by means of a knuckle 57, at the opposite end thereof, with the main transmission shaft 58. The transmission shaft 58 is suitably mounted in a bearing 59 formed in the motor frame. The opposite end of the shaft 58 supports a reversing gear case 60, which is rotatively mounted on said shaft, and is held in position thereon by a collar 61 and a linch pin 62.

Across the face of the gear case 60 extends a spider 63, at the center whereof is formed a hub 64, which bears upon a sleeve 65. The sleeve 65 being rotatively mounted on the shaft 58, the gear case 60 is held concentric with said shaft.

The rim of the spider 63 is rabbeted at the periphery to form a seat for the sprocket toothed ring 66. Bolts 67, which are passed through said ring, said spider, and an edge flange of the case bind the mentioned elements together to form a unit structure.

The ring 66 is operatively engaged by a driving chain 68. The chain 68 is constantly driven by a sprocket 69 on the driving shaft of the motor whereon the flywheel 70 is also mounted. The preferred form of motor, as shown in the drawings, is the internal combustion engine having two cylinders 71.

The case 60 is connected in the manner above described with the driving shaft of the motor having the cylinders 71, and is driven continuously in one direction thereby. Rotary motion is transmitted therefrom to the shaft 58, by means of interposed gear wheels 72, 73, and 74 and 75. The gear wheels 72, 73 are integrally formed or rigidly united, and are mounted on shafts 76, bearings for which are formed in the case 60 and in the spider 63, as best seen in Figs. 4 and 5 of the drawings. The gear wheels 72 and 73 are meshed with the wheels 74 and 75, respectively. The wheels 74 and 75 are keyed to the sleeve 65 and the shaft 58, respectively. By this arrangement it will be seen that when the sleeve 65 is engaged to move with the case 60, the gear wheels 74 and 75 are relatively locked, and the shaft 58 rotates in the direction of the case 60 by reason of the keyed connection therewith of the gear wheel 75. It is equally obvious that when the sleeve 65 is disengaged from the case 60 and allowed to run idly, the shaft 58 is not driven, the gear wheels 73 rolling over the wheels 75 on said shaft. It is also obvious that when the sleeve 65 is held against rotation, the shaft 58 will be rotated in a direction opposite to that of the case 60, for the reason that the gear wheels 72 and 73, in passing around the stationary gear wheel 74, have imparted thereto a rotation relatively the same as that of the case 60, but transmit through the wheel 73 to the wheel 75 a rotation relatively opposite to that of the case 60. The wheel 75 being fixed to the shaft 58, said shaft is likewise rotated in a direction opposite that followed by the case 60.

The above three dispositions of the sleeve 65 are effected by means of a clutch collar 77 and a shifting mechanism for adjusting the same. The clutch collar is keyed to the sleeve 65 and is slidably mounted thereon. Both faces of the collar are provided with teeth 78 to engage teeth 79 and 80 provided on the face of the hub 64 of the spider 63, and on the end of the bearing 59, respectively. The teeth 79 and 80 are separated a distance greater than the length of the collar 77 and the teeth 78 thereof, inclusive, thus providing a median position for said collar.

The locked position of the sleeve 65 and the case 60 above referred to is produced by moving the collar 77 to the position where the teeth 78 thereof engage the teeth 79 of the hub 64. In this position, the shaft 58 is driven in the same rotary direction as the case 60. The free-running position described above is secured by moving the collar 77 to the median position above mentioned, where the teeth 78 are disengaged from both the teeth 79 and 80. The third position above described, where the shaft 58 is rotated in a direction reverse to that of the case 60, is secured by moving the collar 77 to engage the teeth 78 with the teeth 80.

The movement of the collar 77 is controlled by the grip lever 81 and by a spring 90. Connecting the power end 83 of the lever 81 with the lower end of a rocking lever 85, is a connecting rod 82. The rocking lever 85 is pivotally connected with a thrust rod 86, as seen best in Fig. 1 of the drawings. At the end of the rod 86 is a yoke 87, the ends whereof engage a groove 88 with which the collar 77 is provided. The rod 86 is slidably mounted in bearings 91, as seen best in Fig. 5 of the drawings. The spring 90 is wrapped on the rod 86 between the bearings 91, to press upon a pin mounted in the rod 86, to normally thrust the yoke end of the rod 86 toward the reversing gear in the gear case 60.

The normal operation of the spring 90 is to engage the collar 77 and the hub 64 of the spider 63, the result whereof is to drive the tractor in a forward direction. When it is desired to reverse the direction, the grip lever 81 is engaged by the operator and moved to rock the lever 85 and rod 86 connected therewith, forwardly to engage the teeth 78 of the collar 77 with the teeth 80 on the bearing 59, resulting in imparting through the gears in the case 60 a reverse movement to the shaft 58 and to the tractor. When it is desired to hold the clutch collar 77 in a neutral position, the head of the latch 92 is permitted to engage the nick 89 in a quadrant plate suitably disposed, as shown best in Fig. 9 of the drawings. A handle 93 is provided, the operation whereof effects the disengagement of the latch head 92 from the nick 89, after which, the spring 90, if unrestrained, operates to engage the collar 77 with the hub 64 of the spider 63.

The lever 81 is mounted upon one of the handle bars 27 and in close relation to the grip handle 94 thereof. Thus, when following the plow and balancing and steering the same by means of the handle bars 27 and the grip handles 40 and 94 thereof, the attendant may at all times stop or reverse the direction of travel of the implement. Also, as hereinafter described, by manipulating the grip handle 40, he may steer the implement when in service operation.

The steering operation above referred to as that performed while the implement is in service, is performed by shifting the blocks 44 in the tracks formed in the curved section 95 of the frame 17, and of the similarly curved track formed in a bracket 96 suspended below the frame 17 and united thereto by bolts 97, as best shown in Figs. 1 and 2 of the drawings.

The blocks 44 are each provided with an elongated lug 98 to receive pins 99 connecting the same with split rods 100, as best shown in Fig. 3 of the drawings. The rods 100 are pivotally connected at their opposite ends with a swing bar 101. The bar 101 is pivotally connected by a link 102, with a rocking lever 103, best shown in Fig. 2 of the drawings.

The lever 103 is connected by a rod 104, with a short arm 105 rigidly connected with an offset from the grip handle 40. The grip handle 40 is pivoted by means of a pin 106 to one of the handle bars 27, as best shown in Fig. 3 of the drawings. From the foregoing, it is evident that as the grip handle 40 is moved to right or left of the path of travel of the implement, the swing bar 101, blocks 44 and shaft 43 connected therewith, are rocked to change the plane of the tractor wheels 41, and the consequent direction of travel of said wheels and implement connected therewith. As indicated above, this method of steering the implement is one preferred for use while the implement is employed as in the operation of plowing or cultivation. The steering operation effected when the implement is moving to and from the field of labor, is best effected by the wheels 28 and means for turning them on their vertical axes, as above described.

When the implement is being employed as a tractor for a plow or cultivator, and is working in relatively soft soil, the wheels 41 are equipped with spikes 107, these being bolted at intervals to the rim of the wheel by means of screws and nuts 108. When the implement is moving to and from the field, on a road, the spikes 107 are removed. In this position, if desired, a trailer may be attached to the frame 17, using for that purpose the bolts 21 and 29 and other connections adapted to engage eyelets 109 formed in the brackets 96, as shown best in Figs. 1 and 2 of the drawings.

The tractor wheels 41 are rigidly connected to the sleeve 42 by set screws 110 or other suitable and equivalent devices for holding said wheels rigid on said sleeve.

The sleeve 42 is driven by gear wheels 111 and 112, the former of which is rigidly connected with said sleeve by a set screw 113. The wheel 112 is loosely mounted on the sleeve 42, and is provided with elongated slots 114 to engage pins 115 set out from the wheel 111. By means of the above-described connection between the wheels 111 and 112, a small amount of independent movement is provided, to insure the engagement between the teeth of said wheels and the teeth of the pinions 116 and 117 with which said wheels simultaneously engage during a short period. The engaging sides or edges of the wheels 111 and 112 and of the pinions 116 and 117 are beveled to wedge into engagement when said pinions are shifted laterally.

The pinions 116 and 117 are slidably mounted on a sleeve 118 by means of a feather 119, as shown in Fig. 7 of the drawings. The dish-wheel 51 is rigidly mounted on the sleeve 118. The pinions 116 and 117 are integrally constructed, and are separated, as shown best in Figs. 7 and 8 of the drawings. The separation between the two wheels provides for the disengagement between one of the pinions and its corresponding wheel 111 or 112. The distance between the pinions, however, is such as to insure the engagement of the pinion coming into engagement before the pinion passing out of engagement is released from its corresponding wheel. It is during the short interval of simultaneous engagement of the pinions 116 and 117 with their respective wheels 111 and 112, and to provide for the disparity of movement of the wheels 111 and 112, that I provide slots 114 and the pins 115 engaged therewith.

The pinions 116 and 117 are shifted lengthwise of the sleeve 118 by means of an eccentric 120. The eccentric 120 is rigidly connected at the lower end of a vertical shaft 121, which is mounted in a bearing 122 formed at the upper extremity of the offset 50 of the case 46, the bearing being formed in the boss with which the brace rod 47 is engaged. At the upper end of the shaft 121 is mounted a laterally-extending arm 123, connected at one end with a cable 124 and a return spring 125. The cable 124 is carried forward to a hole adjacent the grip handle 94, to be operated by the attendant.

From the foregoing, it will be seen that as the machine is operated, the attendant, engaging the grip handles 40 and 94, and following the plow or other implement, may, by swinging the handle 40, swing the wheels 41 on their vertical axes and steer the implement. It will also be seen that by manipulating the grip lever 81 through the intermediate connections therewith, the clutch collar 77 will be moved selectively and at will, to either a neutral position or to a position controlling the driving operation of the motor having the cylinders 71, to effect either a forward or a rearward movement of the implement. Also, it will be observed that by manipulating the cable 124, he may shift the operating engagement of the pinions 116 and 117 with the wheels 111 and 112, respectively, thereby changing the traction speed of the implement, at will.

It will also be understood that when the wheels 28 or an equivalent trailer, which, if desired may provide a rearwardly-extending body and a driver's seat thereon, is substituted as above noted the manipulation or operation of the tractor would be the same as that above described; that is, the driving station of the implement would have the same relation to the handle bars 27 and the grip handles 40 and 94 as that provided when the attendant is walking.

In the modified form of the reversing gear shown in Figs. 12 to 14 inclusive, there is substituted for the collar 77 above described, a hub 126 of a gear wheel 127. The hub 126 extends through a perforation provided in a spider 128, said spider being the closure member of a gear case 129. The gear case 129 has a bolting flange arranged to register with a corresponding flange on the spider 128, through which is extended screw bolts 130. The screw bolts 130 also pass through a sprocket toothed ring 131, which is clamped between the bolting flanges, as best shown in Fig. 13 of the drawings.

The case 129 is rigidly provided with a hub 132 to form a bearing for said case. The face of the hub 132 is recessed to infold a collar 133, which is held rigidly in position by a pin 134 which is driven through said shaft. The opposite side of the hub is faced to bear against a nut 135, which is held rigidly on the shaft 58 by a pin 136.

Rotatively mounted on the shaft 137 in the gear case 129 and in the spider 128, are wheels 138 and 139. Said wheels are of different diameters, and are integrally or rigidly united. The teeth of the wheel 138 are permanently in mesh with the teeth of the wheel 127. The teeth of the wheel 139 are similarly in mesh with the teeth of a wheel 140. The wheels 127 and 140 are loosely connected, to independently rotate, but to mutually slide on the shaft 58 on which the gear wheel 127 is rotatively mounted, while the gear wheel 140 is held against rotation by a feather 141.

The hub 126 is furnished with a semi-circular overhang 142 to engage a collar 143 on the hub 144 of the wheel 140. At the opposite end, the hub is provided with a truncated tooth 145 to engage the teeth 80 on the bearing block 59. The wheel 140 is provided with truncated clutch teeth 146 to engage corresponding teeth 147 on the hub 132.

The yoke 87 and the rod 86 connected therewith operatively engage the groove 88 in the hub 126 in a manner similar to that described above as to the relation of these parts to the collar 77.

When the grip lever 81 is now manipulated to reverse the shaft 58, the hub 126 is moved to the position shown in Fig. 13, where the truncated tooth 145 engages the teeth 80 on the bearing 59. The wheel 127 being thus held against rotation, the wheels 138 and 139 are rotated on the shaft 137 when the case 129 is driven. The wheel 139 being meshed with the wheel 140, this wheel is rotated, and with it the shaft 58, by reason of the engagement of said wheel 140 with the feather 141.

When the grip lever 81 is released to permit the spring 90 to slide the hub 126 and wheels 127 and 140 on the shaft 58 in the opposite direction, the teeth 146 engage the teeth 147, when it will be found that the case 129, being constantly driven in one direction, rotates the shaft 58 in unison therewith.

Claims.

1. A tractor as characterized, comprising a plurality of traction wheels, an axle for said wheels rigidly connected therewith; a plurality of different-sized driving gear wheels rigidly mounted on said axle; a prime mover, a transmission mechanism operatively engaging said prime mover and driving gear wheels, embodying a plurality of pinions rigidly united in separated relation, the distance separating said pinions approximating and being less than the distance between the outside surfaces of said driving wheels; and means connecting said driving wheels to provide for limited independent action.

2. A tractor as characterized, comprising a plurality of traction wheels; an axle for said wheels rigidly connected therewith; a plurality of different sized driving gear wheels rigidly mounted on said axle; a prime mover; a transmission mechanism operatively engaging said prime mover and driving gear wheels, embodying a plurality of pinions rigidly united in separated relation, the distance separating said pinions approximating and being less than the distance between the outside surfaces of said driving wheels; and a pin and slot connection for said gear wheels, arranged to limit the independent movement thereof while permitting the accommodation of the variation in speed of the engaged pinions and wheels.

3. A tractor as characterized; comprising a plurality of driving gear wheels mounted in parallel relation and yieldingly connected; a plurality of carrying wheels spaced apart to hold said gear wheels therebetween; an axle rigidly connected to said carrying wheels and said gear wheels; a prime mover; a transmission mechanism operatively connecting said driving gear wheels and said prime mover, said transmission mechanism embodying a plurality of pinions adapted to engage said driving wheels; said pinions being spaced apart to engage for a fraction of the time spent in shifting the same, both of said gear wheels; and manually-operative means for selectively shifting said pinions.

4. A tractor as characterized, comprising a plurality of traction wheels; an axle therefor; a following frame pivotally mounted on said axle and having handle grips for manually supporting said frame at the end removed from said wheels; a suspension frame mounted on said following frame; a prime mover mounted on said suspension frame; a transmission driving mechanism operatively connecting said traction wheels and prime mover, said transmission mechanism embodying a rotary case operatively connected with said prime mover and mounted rotatively on a transmission shaft, and a plurality of gear trains mounted within said case and connecting the same with said shaft, the members of said gear trains being relatively proportioned and arranged to vary the transmission from said case to said shaft, and means manually operative to vary the arrangement of said trains.

5. A tractor as characterized, comprising a plurality of traction wheels; an axle therefor, a following frame pivotally mounted on said axle and having handle grips for manually supporting said frame at the end removed from said wheels; a suspension frame mounted on said following frame; a prime mover mounted on said suspension frame; a transmission driving mechanism operatively connecting said traction wheels and prime mover, said transmission mechanism embodying a rotary case operatively connected with said prime mover and mounted rotatively on a transmission shaft, and a plurality of gear trains mounted within said case and connecting the same with said shaft, the members of said gear trains being relatively proportioned and arranged to vary the transmission from said case to said shaft; a sleeve loosely mounted on said shaft and rigidly connected with one of the members of one of said trains; and means operative at will to fixedly engage said sleeve and said case.

6. A tractor as characterized, comprising a plurality of traction wheels; an axle therefor; a following frame pivotally mounted on said axle and having handle grips for manually supporting said frame at the end removed from said wheels; a suspension frame mounted on said following frame; a prime mover mounted on said suspension frame; a transmission driving mechanism operatively connecting said traction wheels and prime mover, said transmission mechanism embodying a rotary case operatively connected with said prime mover and mounted rotatively on a transmission shaft, and a plurality of gear trains mounted within said case and connecting the same with said shaft, the members of said gear trains being relatively proportioned and arranged to vary the transmission from said case to said shaft; a sleeve loosely mounted on said shaft and rigidly connected with one of the members of one of said trains; means operative at will to engage said sleeve and said case; and means for locking said sleeve against rotation, to relatively reverse the drive of said shaft.

7. A tractor as characterized, comprising a plurality of traction wheels; an axle therefor; a following frame pivotally mounted on said axle and having handle grips for manually supporting said frame at the end removed from said wheels; a suspension frame mounted on said following frame; a prime mover mounted on said suspension frame; a transmission driving mechanism operatively connecting said traction wheels and prime mover, said transmission mechanism embodying a rotary case operatively connected with said prime mover and mounted rotatively on a transmission shaft, and a plurality of gear trains mounted within said case and connecting the same with said shaft, the members of said gear trains being relatively proportioned and arranged to vary the transmission from said case to said shaft; a sleeve loosely mounted on said shaft and rigidly connected with one of the members of one of said trains; a sliding clutch having oppositely disposed engaging faces; a fixed member having a face adjacent said clutch constructed to engage said clutch to hold the same and the sleeve connected therewith against rotation; and clutch-operating mechanism connected with the handle of said following frame to be controlled by the attendant on said tractor.

In testimony whereof I have signed my name to this specification in the presence of two subscribing witnesses.

JOSEPH NICHOLAS PARKER.

Witnesses:
   Mrs. H. J. PRYOR,
   D. D. BROWNING.